United States Patent [19]

Martin

[11] Patent Number: 4,825,723

[45] Date of Patent: May 2, 1989

[54] COMPOUND PLANETARY GEAR ASSEMBLY

[75] Inventor: William B. Martin, Redondo Beach, Calif.

[73] Assignee: Allied-Signal Inc., Morris Township, Morris County, N.J.

[21] Appl. No.: 93,440

[22] Filed: Sep. 4, 1987

[51] Int. Cl.$^4$ .................. F16H 37/06; F16H 57/00
[52] U.S. Cl. ........................... 74/705; 74/674; 74/411
[58] Field of Search .............. 74/705, 714, 720.5, 74/674, 410, 411

[56] References Cited

U.S. PATENT DOCUMENTS

| | | | |
|---|---|---|---|
| 2,944,444 | 7/1960 | Burns | 74/705 X |
| 3,008,355 | 11/1961 | Grudin | 74/705 X |
| 3,188,888 | 6/1965 | Zink et al. | 74/411 X |
| 3,307,433 | 3/1967 | Bennett et al. | 74/410 X |
| 3,633,441 | 1/1972 | Hicks | 74/411 X |
| 3,640,150 | 2/1972 | Leiner et al. | 74/674 |

Primary Examiner—Dirk Wright
Attorney, Agent, or Firm—Stuart O. Lowry; James W. McFarland

[57] ABSTRACT

A compound planetary gear assembly has multiple ring gears driven by a set of planet gears and coupled to multiple loads. Two of the ring gears are coupled to a common load via mechanical reaction paths of substantially different lengths to permit the entire assembly to fit within an envelope of reduced overall size. The shorter mechanical reaction path incorporates a compliant gear member which decreases the stiffness or spring rate of the shorter path to correspond substantially with the stiffness or spring rate of the longer path thereby insuring symmetric loading of the planet gears for smooth operation.

15 Claims, 5 Drawing Sheets

COMPOUND PLANETARY GEAR ASSEMBLY

BACKGROUND OF THE INVENTION

The invention was made with Government support under Contract No. N00019-85-C-0145, awarded by the Department of the Navy. The Government has certain rights in this invention.

This invention relates generally to epicyclic or planetary gear trains designed to drive one or more output loads at a selected speed relative to a rotary drive input. More particularly, this invention relates to an improved compound planetary gear assembly designed to drive multiple loads while fitting the gear train components within a compact, substantially minimum profile envelope.

Planetary or epicyclic gear trains in general are relatively well known in the art to include one or more so-called planet gears meshed between input and output gears, wherein the planet gears are designed to rotate about their own axes and to orbit or precess about another axis in the gear train. Such planetary gear trains are commonly used to achieve a substantial speed reduction between a rotational input and output. As one example, in a typical simple planetary gear train having planet gears rotatable about a fixed axis, a central sun gear is rotatably driven about a fixed central axis in meshed relation with normally three or more planet gears which are meshed in turn with an outer ring gear. The sun gear causes the planet gears to rotate about their individual axes and to orbit the sun gear while driving the outer ring gear with a significant speed reduction relative to the sun gear.

In some planetary gear trains, the planet gears are meshed with and drive multiple output ring gears which are coupled to different structural members, resulting in a gear train referred to normally as a compound planetary gear train. For example, in an aircraft flap actuator system, compound planetary gear trains are known wherein a primary output ring gear is mechanically coupled to a wing flap and a secondary output ring gear is mechanically coupled to a wing spar, with the primary output ring gear driving the flap through the differential action of the compound gearing. In this type of system, the secondary ring gear normally constitutes a pair of ring gears meshed at axially opposed ends of the planet gears to achieve symmetrical loading of the planet gears, with both secondary ring gears linked to the common structural load such as a wing spar or the like. Importantly, however, to achieve symmetric loading of the planet gears, the construction is such that the mechanical reaction paths between the two secondary ring gears and their common load exhibit identical stiffnesses or spring rates. This construction insures planet gear orbiting about an axis parallel to the sun and ring gears to avoid locking or binding of the planet gears during operation. In a flap actuator system of the type described above, symmetric loading of the planet gears is most commonly achieved by radial coupling of the output ring gears to their respective loads such as the wing flap and wing spar.

In some compound planetary gear drive applications, radial drive coupling of the output ring gears is either not desirable or not possible. Instead, it is necessary to provide a driven output at one axial end of the gear train. In such applications, the multiple secondary output ring gears are not radially coupled to an external structural member but are coupled to an axially positioned structural member along internal mechanical paths. However, to achieve symmetric gear loading, it is still required for the mechanical paths to exhibit identical stiffnesses or spring rates, wherein this requirement has resulted in gear train configurations which suffer from inefficient use of volumetric space.

There exists, therefore, a significant need for an improved compound planetary gear train designed to provide a driven output at one end of the gear train, wherein the compound gear train is designed for symmetric gear loading in a compact and space-efficient arrangement. The present invention fulfills these needs and provides further related advantages.

SUMMARY OF THE INVENTION

In accordance with the invention, an improved compound planetary gear assembly is provided with primary and secondary output ring gears connected mechanically to different loads. The output ring gears are coupled to their respective loads n a manner permitting the assembly to have a compact size and shape while assuring substantially symmetric loading of driving planet gears for smooth operation at all times.

The improved compound planetary gear assembly includes a central sun gear meshed with a plurality of planet gears for rotatably driving the planet gears about their own axes and orbitally about the axis of the sun gear. The planet gears are meshed in turn at generally axially centered positions with the primary output ring gear which is coupled to a first load. A pair of the secondary output ring gears are meshed with the planet gears on axially opposite sides of the primary ring gear, and both of said secondary ring gears are mechanically coupled to a second load. Both the first and second loads may be movably driven, or, in the alternative, one of the loads may be stationary on a temporary or permanent basis.

In accordance with a major aspect of the invention, the two secondary ring gears are mechanically coupled to the second load by mechanical reaction paths of substantially different lengths, thereby permitting the overall assembly to fit within an envelope of relatively small diametric size. A compliant gear member is included along the shorter mechanical path to provide sufficient reduction in the stiffness or spring rate of that path substantially to match the stiffness or spring rate of the longer mechanical path. The relative stiffness of the two mechanical reaction paths are thus essentially equal thereby insuring substantially symmetric loading of the planet gears.

In the preferred form, the compliant gear member comprises an auxiliary ring gear coupled mechanically between one of the secondary ring gears and the second load. The auxiliary ring gear includes elongated gear teeth formed with a contoured profile selected for substantially uniform stress loading along the lengths thereof. The outboard tips of these gear teeth are radiused to define rounded contours sized to fit into mating radiused seats in a spline member forming another portion of the shorter mechanical path. The gear teeth of the auxiliary gear have sufficient compliance to permit positional shifting between the gear teeth and the spline member, as permitted by the engaged radiused surfaces, to match the compliance of the longer mechanical path associated with the other secondary ring gear.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
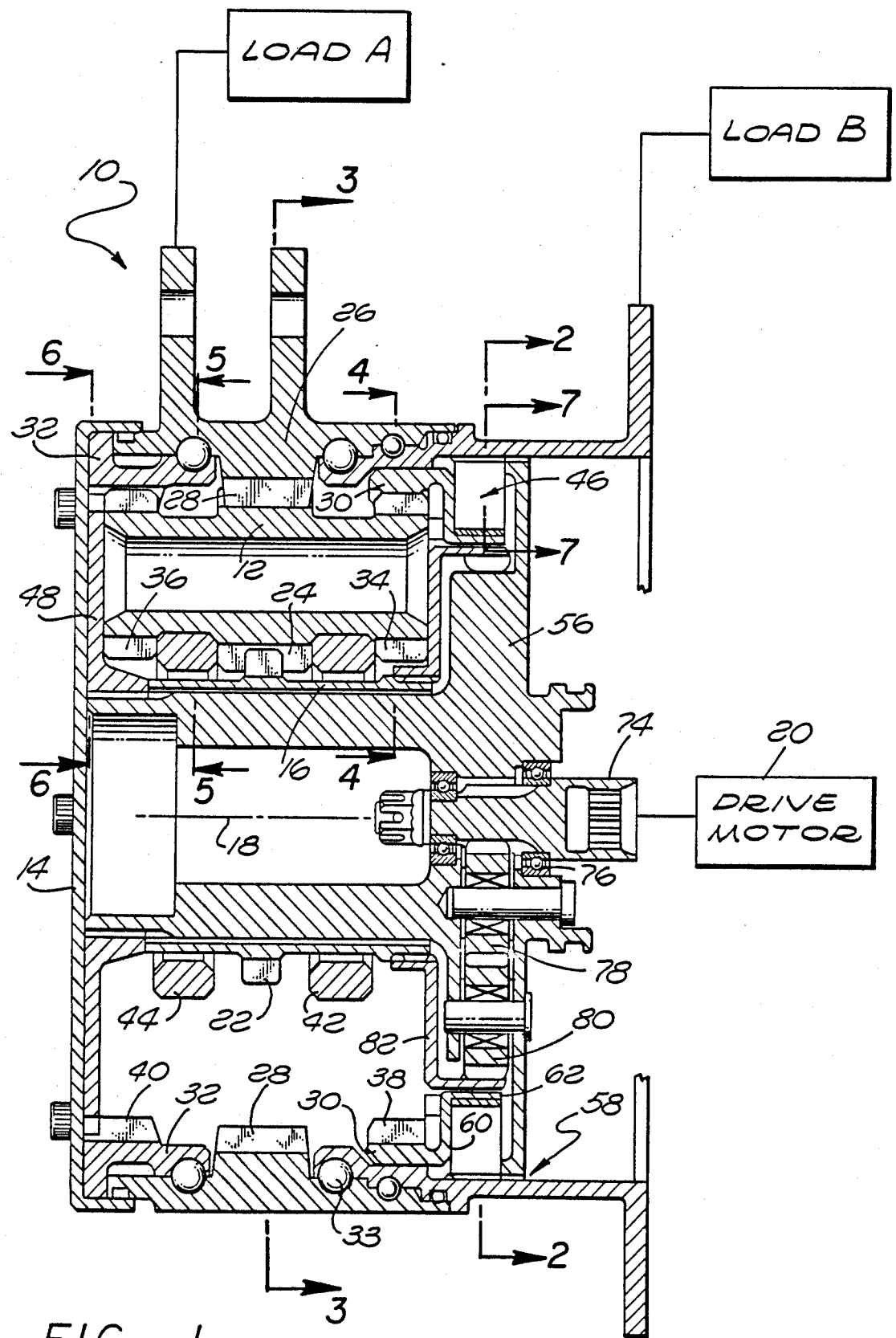
FIG. 1 is a somewhat schematic vertical sectional view illustrating an improved compound planetary gear assembly embodying the novel features of the invention.

As shown in the exemplary drawings, an improved compound planetary gear assembly referred to generally by the reference numeral 10 is designed for connection to multiple output loads, such as the loads A and B depicted in FIG. 1. The improved gear assembly 10 is constructed to have a relatively compact size for use in specialized applications while insuring substantially symmetric loading of orbiting planet gears 12 for smooth operation particularly at high loads and/or high speed operation.

Figure 3:
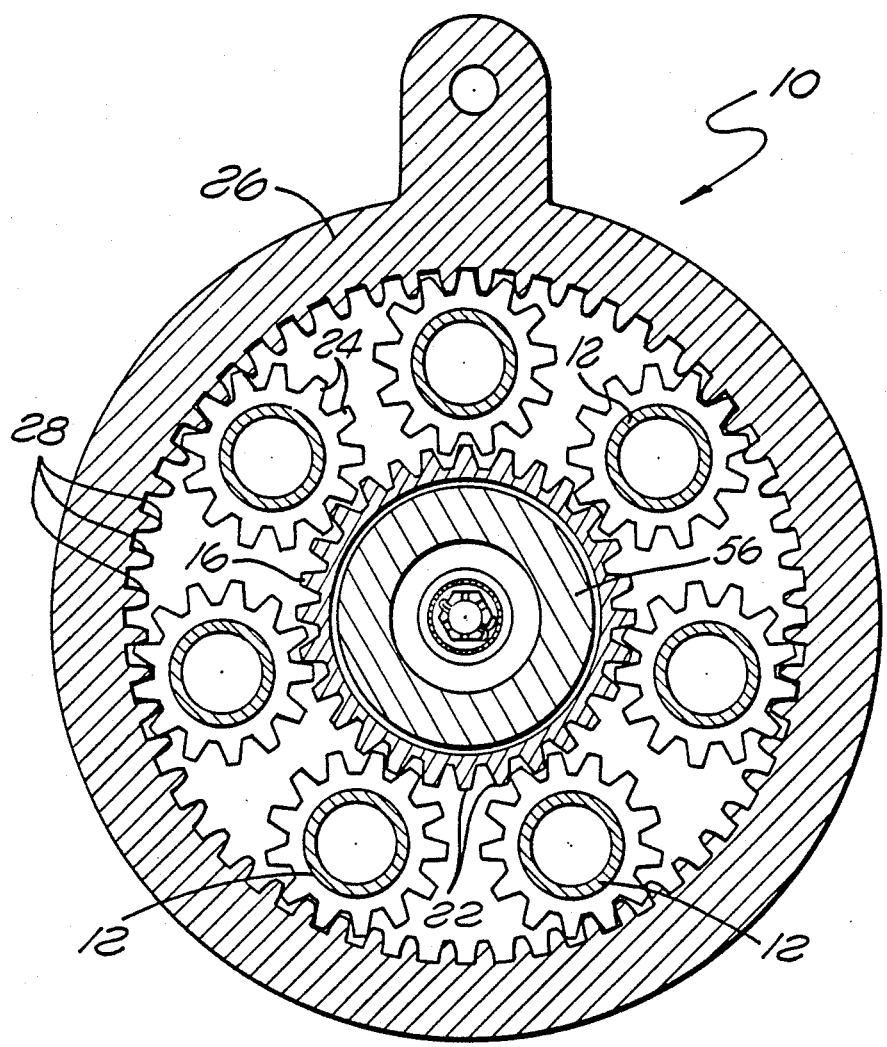
FIG. 3 is a vertical sectional view taken generally on the line 3—3 of FIG. 1.

The compound planetary gear assembly 10 of the present invention comprises a gearbox housing 14 having an appropriate size and shape to encase the various gearbox components. Such gearbox components traditionally include an inner sun gear 16 (FIGS. 1 and 3) supported by the housing for rotation about a central axis 18 in response to operation of a suitable drive motor 20 or the like, as will be described in more detail. The sun gear 16 includes an external encircling array of gear teeth 22 meshed with mating centrally located primary teeth 24 of a plurality of the planet gears 12, with seven planet gears being shown in the illustrative embodiment of the invention (FIG. 3). In general terms, this set of planet gears 12 is disposed in a circular array between the sun gear 16 and a primary output ring gear 26 having an inner set of gear teeth 28 also engaged with the central primary teeth 24 of the planet gears 12. In operation, rotational driving of the sun gear 16 about its central axis 18 correspondingly rotates the planet gears 12 about their individual axes and further causes those planet gears to orbit slowly about the central axis 18. These orbital and rotational movements of the planet gears 12 result in rotational driving of the primary output ring gear 26 with substantial speed reduction relative to the sun gear 16, to rotationally drive the load A, as depicted schematically in FIG. 1.

The planet gears 12 are also meshed with a pair of secondary output ring gears 30 and 32 which provide the compound nature of the planetary gear assembly 10 by virtue of their driving connection with the load B, as will be described in more detail. Bearings 33 conveniently support the primary ring gear 26 for rotation independently of the secondary ring gears 30 and 32. These bearings 33 are depicted in the accompanying drawings in the form of ball bearings within tracks separating the secondary ring gear 32 and a portion of the housing coupled to the load B from the primary ring gear 26.

Figure 4:
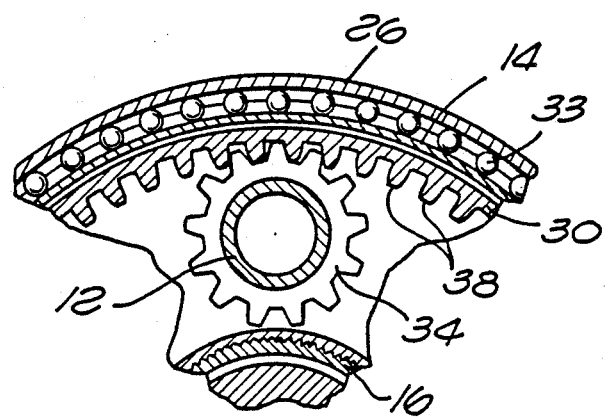
FIG. 4 is a fragmented vertical sectional view taken generally on the line 4—4 of FIG. 1.
Figure 5:
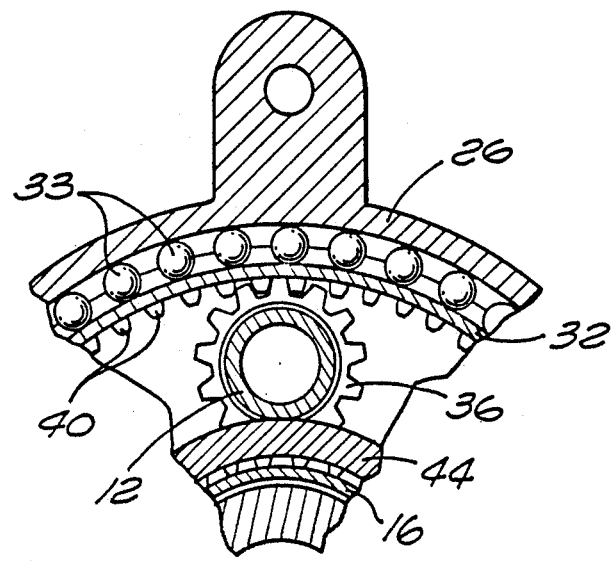
FIG. 5 is a fragmented vertical sectional view taken generally the line 5—5 of FIG. 1.

More particularly, as viewed in FIGS. 1, 4 and 5, the planet gears 12 include sets of secondary teeth 34 and 36 respectively at the axially opposite ends thereof for meshed engagement with internal sets of teeth 38 and 40 on the two secondary ring gears 30 and 32. The relative numbers of the teeth associated with these secondary ring gears 30 and 32 will normally differ from those associated with the primary ring gear 26 such that the primary and secondary ring gears are driven at different rotational speeds, with the secondary ring gears 30 and 32 being coupled mechanically to drive the load B.

This secondary output drive is conventionally obtained by means of the two secondary output ring gears 30 and 32 engaged with each planet gear 12 in a symmetric manner designed to balance forces applied to the planet gears 12 and thereby achieve smooth gearbox operation. Annular bearing rings 42 and 44 or the like are conveniently disposed about the sun gear 16 in positions axially between the central or primary planet teeth 24 and the sets of secondary teeth 34 and 36 to assist in retaining the planet gears in position.

In accordance with a primary aspect of the invention, the two secondary output ring gears 30 and 32 are linked to the common load B by a respective pair of mechanical reaction paths leading to one axial side of the gearbox housing 14. That is, the secondary ring gear 30 is coupled to the load B via a mechanical path of relatively short length leading directly from the gearbox components to the load B. The other secondary output ring gear 32 at the opposite axial end of the gearbox is linked to the load B via a significantly longer mechanical path extending axially through the hollow cylindrical sun gear 16 to the load B. While this arrangement results in mechanical reaction paths of significantly different lengths between the load B and the ring gears 30 and 32, it permits the overall diametric size of the gearbox to be substantially reduced. Differences in stiffness or compliance of the two mechanical reaction paths are compensated by means of a compliant gear member 46 forming a portion of the shorter mechanical path associated with the secondary ring gear 30 to insure matching of the reaction path stiffness. As a result, notwithstanding the significant differences in reaction path length, the secondary ring gears 30 and 32 present uniform loads to the planet gears 12 for symmetric loading of the planet gears 12 at all times.

Figure 6:
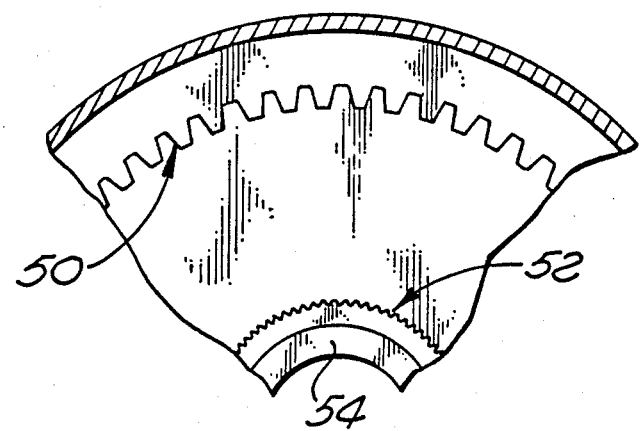
FIG. 6 is a fragmented vertical sectional view taken generally on the line 6—6 of FIG. 1.

As shown best in FIGS. 1 and 6, the mechanical reaction path associated with the secondary output ring gear 32 is defined by an annular drive plate 48 having outer teeth 50 meshed with the output ring gear teeth 40. Accordingly, the drive plate 48 is locked for rotation with the output ring gear 32. The inner diameter of this drive plate 48 is engaged by means of a splined connection 52 with an inner sleeve member 54 extending coaxially within the sun gear 16 to the opposite side of the gearbox, whereat the sleeve member 54 includes a radially expanded flange 56 (FIG. 1) connected by another splined connection 58 to the load B.

Figure 2:
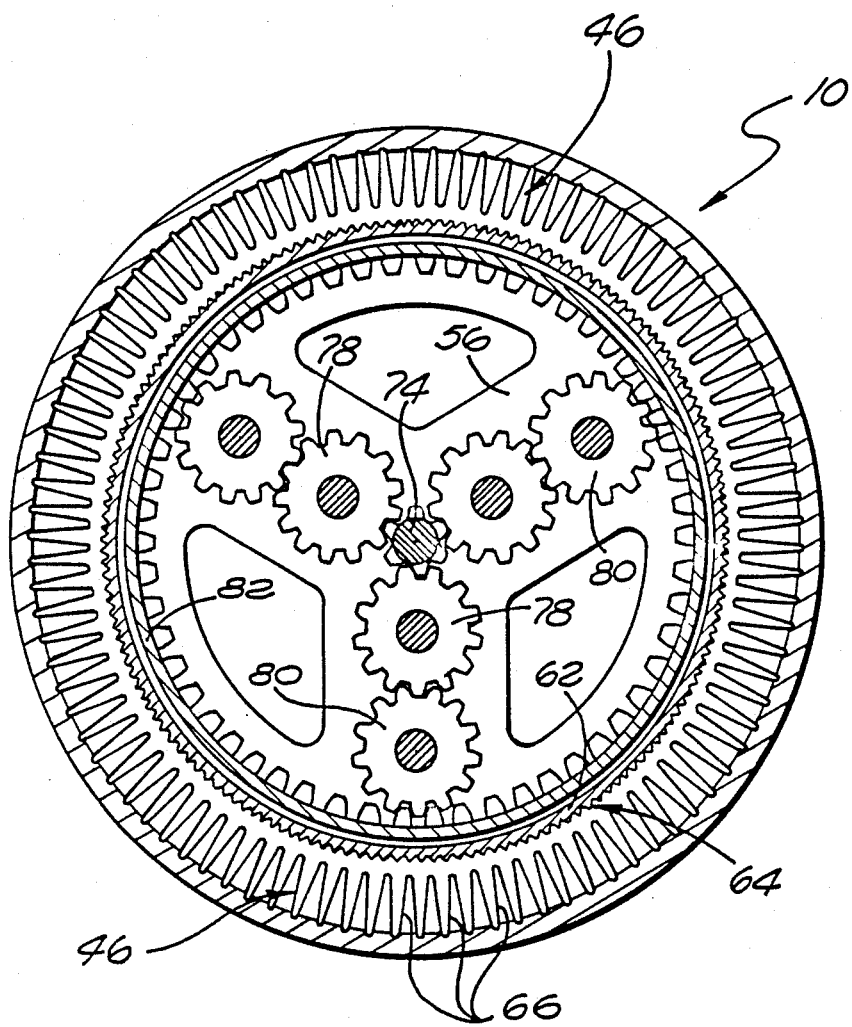
FIG. 2 is a vertical sectional view taken generally on the line 2—2 of FIG. 1.
Figure 7:
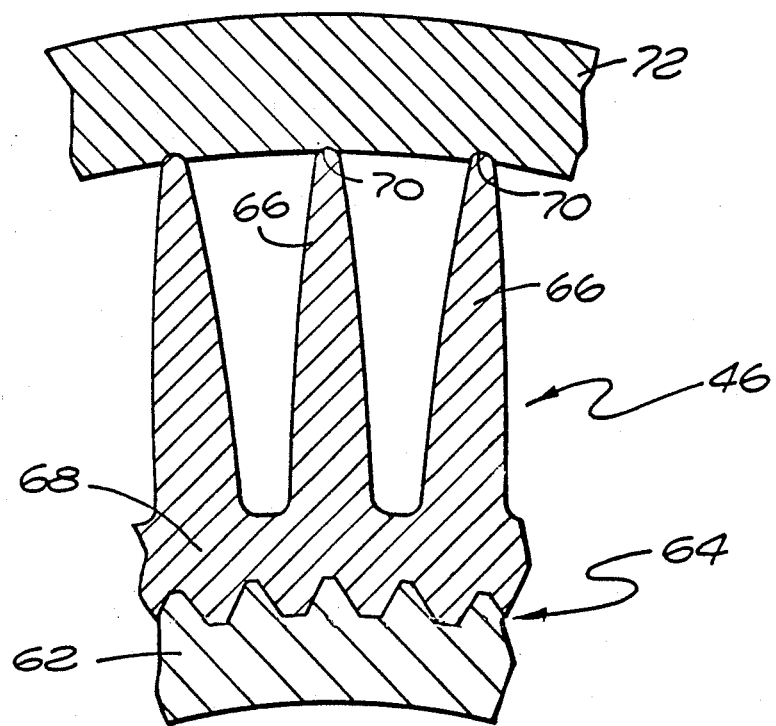
FIG. 7 is an enlarged fragmented vertical sectional view taken generally on the line 7—7 of FIG. 1.

In contrast, the shorter mechanical reaction path associated with the other secondary output ring gear 30 is illustrated in FIGS. 2 and 7. This shorter reaction path is defined by a short radially inset wall 60 joined to the axially outboard end of the output ring gear 30, wherein the inset wall 60 is joined in turn to a short cylindrical sleeve 62. The outer diameter surface of this short sleeve 62 is serrated or otherwise appropriately shaped in cooperation with an inner diameter surface of the compliant gear member 46 to define a splined connection 64 therebetween, as shown in FIG. 7. Elongated teeth 66 of specialized configuration are engaged in turn with a sleeve portion 72 of the housing 14 coupled to the load B to complete the shorter mechanical path associated with the ring gear 30.

The compliant gear member 46 is formed from a selected material and with a selected configuration to introduce limited variable compliance into the shorter path associated with the output ring gear 30, thereby matching the stiffness of the longer path associated with the related output ring gear 32. In the preferred form, the compliant gear member 46 is formed from a hardened steel or the like as an auxiliary ring gear to include a narrow annular base ring 68 with an inner diameter shaped for splined interlock with the sleeve 62. The elongated teeth 66 project radially outwardly from the base ring 68 on precision centers, with each tooth 66 having flat axially opposed surfaces and a tooth profile designed for uniform stress loading along the lengths thereof, such as a parabolic tooth profile. The outermost tips of the teeth 66 terminate in a smoothly rounded or radiused shape for mating engagement into shallow smoothly rounded seats 70 on an inner diameter surface of the sleeve portion 72 joined to the load B.

In operation, in response to mechanical loading of the reaction path between the load B and the output ring gear 30, the spring characteristics of the elongated teeth 66 of the compliant gear member 46 permit slight rotational misalignment or shifting between the base ring 68 and the load sleeve 72. This shifting is accommodated without interruption in smooth gearbox operation by the rounded tips of the teeth 66 shifting or rotating within their respective rounded seats 70, without disengagement therefrom. In practice, a shifting capability on the order of about 0.005 inch is sufficient to match the stiffness of the longer mechanical path associated with the other secondary output ring gear 32. Moreover, in a typical application of the invention, spring rate characteristics for the compliant teeth 66 on the order of a few million inch-pounds per radian will provide the desired compliance level.

In one preferred application of the improved compound planetary gear assembly 10, the primary and secondary output ring gears are utilized for displacing the rotor blades (not shown) of a helicopter between deployed and stored configurations, with the blades extending generally along the aircraft fuselage in a low profile manner when stored. The primary output ring gear 26 is mechanically linked to a latch (load A) for locking and unlocking the blades, whereas the secondary output ring gears 30 and 32 are coupled mechanically to the rotor blades (load B) to displace the blades. For example, with the blades locked in the deployed position for flight operation, the gear assembly 10 can be operated to displace the primary output ring gear 26 in a manner withdrawing the latch (load A) to unlock the blades while the secondary output ring gears 30 and 32 remain fixed. Upon cessation of latch movement, such as upon impact with a suitable stop (not shown), the primary output ring gear 26 becomes fixed and the now-mobile secondary output ring gears 30 and 32 begin to displace the blades (load B) to the stored position. Gearbox operation can be halted by appropriate switch means (not shown) when the stored position is reached. Reverse operation of the gear assembly 10 is effective to redeploy and then relock the blades in the deployed state. Importantly, the compliant gear member 46 insures symmetric planet gear loading at all times throughout such operation which can occur with high speed reductions of 10,000:1 or higher. Moreover, the compliant gear member 46 presents sufficient compliance into the system to dissipate kinetic energy when a stop is impacted thereby avoiding the need to utilize additional system components for that function.

FIGS. 1 and 2 depict one convenient apparatus for reversibly driving the sun gear 16 to achieve the reversible gearbox operation described above with respect to helicopter rotor blade deployment, together with a high overall speed reduction as required in such applications. In particular, the drive motor 20 reversibly rotates a drive shaft 74 mounted for rotation within the sleeve member 54 by suitable bearings 76. This drive shaft 74 is meshed with radially arranged pairs of star gears 78 and 80 (FIG. 2) carried by the flange 56 on the sleeve member 54, with three star gear sets being shown by way of example. The outer star gear 80 of each set is meshed with an outer drive ring 82 which is meshed with and transmits rotary motion to the sun gear 16.

Alternative gear assembly configurations may, of course, utilize alternative means for rotary driving of the sun gear 16 in a unidirectional or reversible manner. The primary and secondary output ring gears may be adapted for simultaneous displacement upon gearbox operation, or either may be fixed temporarily or permanently. In any case, the gear assembly can be constructed with a small profile configuration with matched stiffness in the mechanical reaction paths associated with the two secondary output ring gears. Importantly, this stiffness matching insures smooth gearbox operation without gear component binding throughout operation, including high speed and high load operation.

Further modifications and improvements to the gear assembly 10 will be apparent to those skilled in the art. Accordingly, no limitation in intended by way of the description herein and the accompanying drawings, except by way of the appended claims.

What is claimed is:

1. A compound planetary gear assembly, comprising:
   a sun gear;
   a set of planet gears meshed with said sun gear for rotational movement about their respective axes and for orbital movement about said sun gear upon rotational driving of said sun gear;
   a primary output ring gear meshed in generally axially centered relation with said planet gears;
   a pair of secondary output ring gears meshed generally at opposite axial ends, respectively, with said planet gears;
   first means for coupling said primary output ring gear to a first load; and
   second means for coupling said pair of secondary output ring gears to a second load, said second means defining a pair of mechanical reaction paths of substantially different lengths extending respectively between said second load and said secondary ring gears, said second means further including a compliant coupling member along the shorter of the two mechanical reaction paths to insure substantial matching in stiffness between the two mechanical reaction paths.

2. The compound planetary gear assembly of claim 1 wherein said compliant coupling member comprises a compliant gear member.

3. The compound planetary gear assembly of claim 1 wherein said complaint coupling member comprises an auxiliary ring gear having elongated teeth each having a smoothly rounded tip, said second means further including a sleeve member having smoothly rounded seats for meshed engagement of said tips of said teeth therein.

4. The compound planetary gear assembly of claim 3 wherein said teeth of said auxiliary ring gear have a tooth profile designed for substantially uniform stress loading along the lengths thereof.

5. The compound planetary gear assembly of claim 3 wherein said teeth of said auxiliary ring gear have a parabolic tooth profile.

6. The compound planetary gear assembly of claim 3 wherein said auxiliary ring gear is formed from a hardened steel.

7. The compound planetary gear assembly of claim 3 wherein said second means includes spline means for interconnecting said auxiliary ring gear for rotation with one of said secondary ring gears, said sleeve member being coupled to said second load.

8. The compound planetary gear assembly of claim 1 further including means for rotatably driving said sun gear.

9. The compound planetary gear assembly of claim 1 wherein said sun gear comprises a hollow cylindrical sun gear, said compliant coupling member being coupled between one of said secondary ring gears and said second load at one axial end of said planet gears, said second means further including means extending axially through the interior of said sun gear for coupling the other of said secondary ring gears to said second load at said one axial end of said planet gears.

10. A compound planetary gear assembly, comprising:
a sun gear;
a set of planet gears meshed with said sun gear for rotational movement about their respective axes and for orbital movement about said sun gear upon rotational driving of said sun gear;
at least two output ring gears meshed with said planet gears;
means for coupling said output ring gears to a load along respective mechanical reaction paths of substantially different lengths, said coupling means further including a compliant coupling member along a shorter one of the mechanical reaction paths to insure substantial matching in stiffness between the mechanical reaction paths.

11. The compound planetary gear assembly of claim 10 wherein said compliant coupling member comprises a compliant gear member.

12. The compound planetary gear assembly of claim 10 wherein said compliant coupling member comprises an auxiliary ring gear having elongated teeth each having a smoothly rounded tip, said coupling means further including a sleeve member having smoothly rounded seats for meshed engagement of said tips of said teeth therein.

13. The compound planetary gear assembly of claim 12 wherein said coupling means includes spline means for interconnecting said auxiliary ring gear for rotation with one of said output ring gears, said sleeve member being coupled to said load.

14. The compound planetary gear assembly of claim 10 wherein said sun gear comprises a hollow cylindrical sun gear, said compliant coupling member being coupled between one of said output ring gears and said load at one axial end of said planet gears, said coupling means further including means extending axially through the interior of said sun gear for coupling another of said output ring gears to said load at said one axial end of said planet gears.

15. A compound planetary gear assembly, comprising:
a hollow cylindrical sun gear;
a set of planet gears meshed with said sun gear for rotational movement about their respective axes and for orbital movement about said sun gear upon rotational driving of said sun gear;
a primary output ring gear meshed in generally axially centered relation with said planet gears;
a pair of secondary output ring gears meshed generally at opposite axial ends, respectively, with said planet gears;
first means for coupling said primary output ring gear to a first load; and
second means for coupling said pair of secondary ring gears to a second load, said second means including a compliant gear member coupled between one of said secondary ring gears and said second load at one axial end of said planet gears, and means extending from the other of said secondary ring gears axially through said sun gear to said second load at said one end of said planet gears.

* * * * *